United States Patent
Freeman et al.

(10) Patent No.: US 10,062,519 B2
(45) Date of Patent: Aug. 28, 2018

(54) TANTALUM CAPACITOR WITH POLYMER CATHODE

(71) Applicant: Kemet Electronics Corporation, Simpsonville, SC (US)

(72) Inventors: Yuri Freeman, Simpsonville, SC (US); Steven C. Hussey, Simpsonville, SC (US); Jimmy Dale Cisson, Simpsonville, SC (US); Philip M. Lessner, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 108 days.

(21) Appl. No.: 14/853,493

(22) Filed: Sep. 14, 2015

(65) Prior Publication Data

US 2016/0079004 A1    Mar. 17, 2016

Related U.S. Application Data

(60) Provisional application No. 62/050,504, filed on Sep. 15, 2014.

(51) Int. Cl.

| | |
|---|---|
| *H01G 9/012* | (2006.01) |
| *H01G 9/052* | (2006.01) |
| *H01G 13/00* | (2013.01) |
| *H01G 9/10* | (2006.01) |
| *H01G 9/00* | (2006.01) |
| *H01G 9/042* | (2006.01) |
| *H01G 9/15* | (2006.01) |
| H01G 9/14 | (2006.01) |

(52) U.S. Cl.
CPC .......... *H01G 9/012* (2013.01); *H01G 9/0036* (2013.01); *H01G 9/0425* (2013.01); *H01G 9/052* (2013.01); *H01G 9/10* (2013.01); *H01G 9/15* (2013.01); *H01G 13/003* (2013.01); H01G 9/14 (2013.01)

(58) Field of Classification Search
CPC ........ H01G 9/012; H01G 9/028; H01G 9/035; H01G 9/042; H01G 9/045; H01G 9/10; H01G 9/052
See application file for complete search history.

(56) References Cited

U.S. PATENT DOCUMENTS

| | | | | |
|---|---|---|---|---|
| 4,224,656 A | * | 9/1980 | DeMatos | ............. H01G 9/0003 29/25.03 |
| 4,539,146 A | * | 9/1985 | Melody | .................. H01G 9/022 252/62.2 |

(Continued)

OTHER PUBLICATIONS

Yuri Freeman et al., "Electrical Characterization of Tantalum Capacitors with Poly (3,4-ethylenedioxythiophene) Counter Electrodes"; Journal of the Electrochemical Society.

(Continued)

*Primary Examiner* — Nguyen Ha
(74) *Attorney, Agent, or Firm* — Joseph T. Guy; Patent Filing Specialist, Inc.

(57) ABSTRACT

An improved capacitor and a method for forming an improved capacitor is detailed. The method comprises forming a tantalum anode from a tantalum powder with a powder charge of no more than 40,000 μC/g; forming a dielectric on the anode by anodization at a formation voltage of no more than 100 V; and forming a conductive polymeric cathode on the dielectric wherein the capacitor has a breakdown voltage higher than the formation voltage.

18 Claims, 3 Drawing Sheets

(56) References Cited

U.S. PATENT DOCUMENTS

| | | | | |
|---|---|---|---|---|
| 4,569,693 | A * | 2/1986 | Albrecht | B22F 1/0003 |
| | | | | 29/25.03 |
| 5,560,761 | A | 10/1996 | Naito | |
| 6,319,459 | B1 | 11/2001 | Melody et al. | |
| 7,268,996 | B1 * | 9/2007 | Dapo | H01G 9/035 |
| | | | | 252/62.2 |
| 7,423,862 | B2 * | 9/2008 | Naito | H01G 9/0036 |
| | | | | 29/25.01 |
| 8,349,030 | B1 | 1/2013 | Hussey et al. | |
| 2007/0214857 | A1 * | 9/2007 | Wong | B21C 33/004 |
| | | | | 72/275 |
| 2007/0221507 | A1 * | 9/2007 | Liu | A61N 1/3975 |
| | | | | 205/316 |
| 2008/0010797 | A1 * | 1/2008 | Qiu | H01G 9/0036 |
| | | | | 29/25.03 |
| 2009/0103247 | A1 * | 4/2009 | Karnik | C04B 35/495 |
| | | | | 361/529 |
| 2010/0265634 | A1 * | 10/2010 | Freeman | H01G 9/012 |
| | | | | 361/529 |
| 2011/0317334 | A1 * | 12/2011 | Pinwill | H01G 9/032 |
| | | | | 361/525 |
| 2012/0134073 | A1 * | 5/2012 | Uher | H01G 9/028 |
| | | | | 361/528 |
| 2012/0300370 | A1 * | 11/2012 | Chacko | H01G 9/028 |
| | | | | 361/528 |
| 2013/0242464 | A1 * | 9/2013 | Biler | C25D 9/02 |
| | | | | 361/504 |

OTHER PUBLICATIONS

Y. Freeman et al., "Anomalous Currents in Low Voltage Polymer Tantalum Capacitors", ECS Journal of Solid State Science and Technology.

* cited by examiner

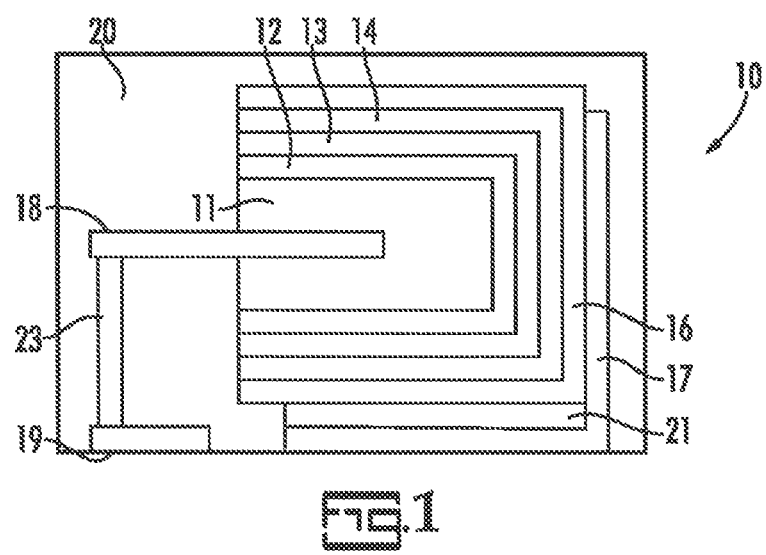

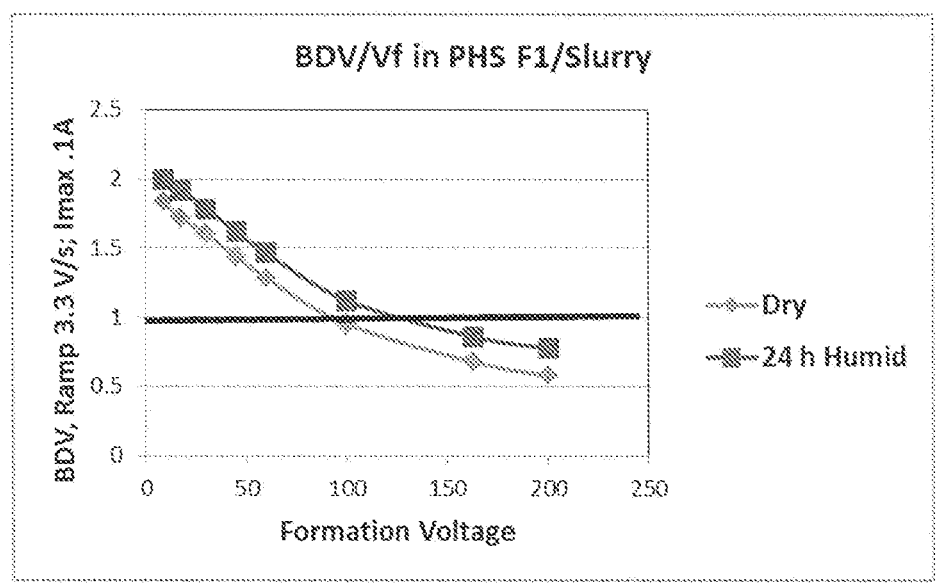
Fig. 2: BDV to Formation Voltage Ratio for 12,000 μC/G powder

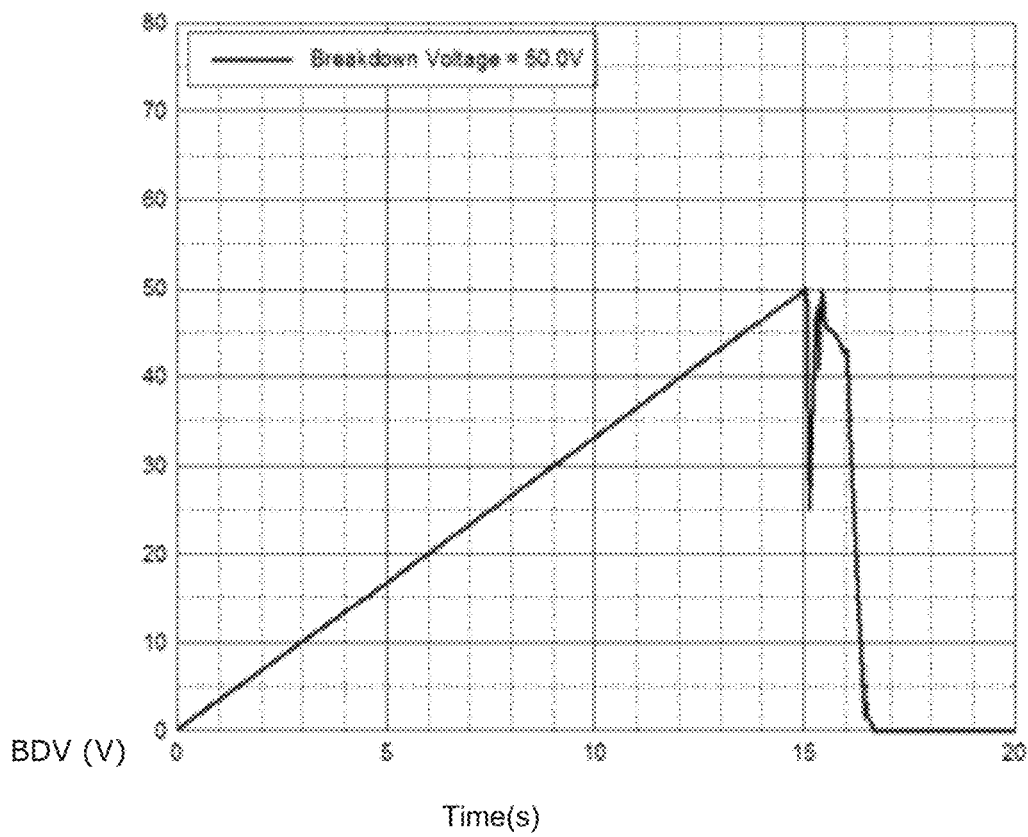
Fig. 3: Voltage Trace and Electrical Parameters Before and After Breakdown for Humidified 12K Powder and 28 V formation

TANTALUM CAPACITOR WITH POLYMER CATHODE

CROSS-REFERENCE TO RELATED APPLICATIONS

The present invention claims priority to U.S. Provisional Patent Application No. 62/050,504 filed Sep. 15, 2014.

BACKGROUND

The present invention is related to an electrolytic capacitor. More specifically the present invention is related to an electrolytic capacitor comprising intrinsically conductive polymeric cathode layers capable of achieving a high break down voltage (BDV) wherein the BDV exceeds the dielectric formation voltage which was previously not considered feasible with polymeric cathode layers.

Solid electrolytic capacitors with intrinsically conductive polymers as the cathode material have been widely used in the electronics industry due to their advantageous low equivalent series resistance (ESR) and "non-burning/non-ignition" failure mode. Intrinsically conductive polymer, more commonly known as conductive polymer, is electrically conductive in the molecular level. In other words, a single molecule (a polymer chain) of this type of polymer is conductive, which distinguishes itself from other groups of polymeric materials whose electrical conductivity is due to percolation between conductive particles within the polymer. The example of the latter is non-conductive polyester filled with conductive carbon back particles. The intrinsically conducting polymer can exist in many physical forms including solid, solution, and liquid dispersion.

The backbone of a conductive polymer consists of a conjugated bonding structure. The polymer can exist in two general states, an undoped, non-conductive state, and a doped, conductive state. In the doped state, the polymer is conductive but of poor processibility due to a high degree of conjugation along the polymer chain, while in its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in doped form after the completion of processing, although during the process, the polymer can be undoped/doped to achieve certain process advantages.

Various types of conductive polymers including polypyrrole, polyaniline, and polythiophene are described for use in Ta capacitors. The major drawback of conductive polymer capacitors regardless of the types of conductive polymers employed, is their relatively high ratio between formation voltage of the dielectric and rated voltage of the capacitor, which affected charge efficiency of these capacitors. Furthermore, upon failure capacitors with a conductive polymer cathode fail in a closed circuit mode, wherein the capacitor essentially represents an electrical short, which can be detrimental to the circuit.

There has been a long-standing desire in the art to provide a capacitor comprising a conducting polymeric cathode suitable for use at lower ratio between formation and rated voltages, which requires breakdown voltage exceeding formation voltage. It was also a long-standing desire in the art to provide tantalum capacitor with open failure mode.

Through diligent research the present inventors have achieved what was previously not considered feasible.

SUMMARY

It is an object of the invention to provide a capacitor with a higher breakdown voltage and an open circuit failure mode.

A particular feature of the invention is the ability to achieve a breakdown voltage, with a conductive polymer cathode, which is higher than the formation voltage which previously not considered achievable.

Yet another advantage is the ability to form a capacitor at a given voltage and rate the capacitor at a rated voltage which is over 60% of the formation voltage thereby decreasing the energy demand in capacitor formation.

These and other advantages, as will be realized, are provided in a method for forming a capacitor. The method comprises forming a tantalum anode from a tantalum powder with a powder charge of no more than 40,000 µC/g; forming a dielectric on the anode by anodization at a formation voltage of no more than 100 V; and forming a conductive polymeric cathode on the dielectric wherein the capacitor has a breakdown voltage higher than the formation voltage.

Yet another advantage is provided in a capacitor comprising a tantalum anode with a dielectric on the anode a conductive polymeric cathode on the dielectric. The capacitor has a breakdown voltage of at least 1 V to no more than 100 V and an open circuit failure mode when exposed to voltage above the breakdown voltage.

BRIEF DESCRIPTION OF DRAWINGS

FIG. 1 is a schematic representation of an embodiment of the invention.

FIG. 2 is a graphical representation of breakdown voltage as a function of formation voltage.

FIG. 3 is a graphical representation of breakdown voltage testing.

DESCRIPTION

The present invention is directed to an electrolytic capacitor with a conductive polymer cathode wherein the capacitor has a high breakdown voltage and an open circuit failure mode. More specifically, the present invention is related to a capacitor with a breakdown voltage which is higher than the formation voltage.

The rated voltage for Ta capacitors, or the working voltage allowed for reliable operation, is primarily a function of dielectric thickness. The formation voltage is controlled by dielectric thickness wherein increasing the formation voltage increases the dielectric thickness. It is estimated that for every volt applied during the dielectric formation process, about 1.7 to about 2 nm of dielectric is formed on the surface. For a given anode, increasing dielectric thickness is at a cost of capacitance loss since the anode capacitance is inversely proportional to dielectric thickness. It is a common practice for solid Ta capacitor manufacturers to use a formation voltage 2.5 to 4 times higher than the anode rated voltage. This ensures high reliability during applications. For example, a 10V rated capacitor often employs an anode formed at about 30V. The present invention allows a capacitor to be rated at a maximum rated voltage of 60-90% of the formation voltage wherein the maximum rated voltage is the highest voltage a capacitor can withstand with low and stable DC leakage during long-term life test or field application at 85° C., the highest operating temperature without de-rating. Alternatively, the present invention allows a capacitor to be rated at a maximum rated voltage of 50-85% of the breakdown voltage.

Breakdown voltage (BDV) is one indication of dielectric quality. Measured BDV for tantalum capacitors normally does not exceed formation voltage ($V_f$) and can be significantly less. It is generally desirable to have a BDV which exceeds rated voltage ($V_r$) by about a factor of 1.5 to 2 times. Therefore, $V_r$ is less than $V_f$ by a factor that usually ranges from 2 to 4 times. This ratio leads to a decrease in efficiency because $CV_r$ is less than $CV_f$. It has been considered impossible to manufacture a tantalum capacitor whose BDV exceeds its formation voltage and which fails in an open circuit mode. Remarkably, we found that for certain tantalum capacitors manufactured with slurry polymer under certain conditions of $V_f$ that BDV can exceed $V_f$ by a significant amount.

Tantalum powder can be obtained with a wide range of powder charge, which is measured in µC/g. In general, artisans have sought as high a powder charge as possible for given rated voltage. It has been surprisingly realized that lower powder charges, less than 40,000 µC/g, when formed as described herein can achieve a higher breakdown voltage, relative to formation voltage, and a open circuit failure mode both of which were not previously considered possible with conductive polymer cathodes. It is therefore quite surprising to find, as disclosed herein, that the combination of tantalum powder with a powder charge of no more than 40,000 µC/g and a conductive polymer cathode provides a breakdown voltage which is actually higher than the dielectric formation voltage at a formation voltage of less than 100 V. It is preferable that the formation voltage is at least 25 V, more preferably at least 35 V and even more preferably at least 40 V. It is preferable that the powder charge be at least 5,000 µC/g. It is particularly preferred that the powder charge be at least 10,000 µC/g to no more than 25,000 µC/g. Above about 40,000 µC/g the pore size does not allow for sufficient slurry polymer penetration and therefore the capacitance is insufficient. Below about 5,000 µC/g the capacitance is insufficient. It is also surprising that the capacitor formed with the inventive combination fails in an open circuit configuration instead of a closed circuit configuration.

During manufacture the Ta powder is mechanically pressed to make Ta metal pellets. The pellets are subsequently sintered at high temperature under vacuum or with a decarbonizing and deoxidizing steps as set forth in *The Journal of Electrochemical Society*, 156(6) G65-G70 (2009) with alkanolamine, as set forth in U.S. Pat. No. 6,319,459, which is incorporated herein by reference, or with a reducing agent with a higher oxygen affinity than tantalum such as an alkali metal, alkaline earth metal or aluminum as set forth in U.S. Pat. No. 8,349,030, which is incorporated herein by reference. The sintered anodes are then anodized in a liquid electrolyte at elevated temperature to form a cohesive dielectric layer of $Ta_2O_5$ on the anode surface. Increasing formation voltage increases the dielectric thickness, which determines the maximum voltage the anodes can withstand.

Polymer cathodes can be applied to tantalum capacitors by dipping into a slurry of preformed polymer. Alternatively, the polymer can be formed by synthesis from the monomer and an oxidizing agent in a process known as 'in-situ' polymerization. Typically the in-situ polymerization includes the steps of dipping in oxidizing agent, drying, dipping in monomer, reacting the monomer and oxidizing agent to form conductive polymer and washing of byproducts not necessarily in this order. Optionally, a reform step may be applied after washing to reduce DC leakage of finished capacitors. For the purposes of the instant invention it is preferable to use a polymer slurry due to the lack of by-products that are difficult to wash out from porous anodes and can the by-products may contaminate dielectric-polymer interface.

The invention will be described with reference to the figures forming an integral, non-limiting, component of the disclosure. Throughout the disclosure similar elements will be numbered accordingly.

The invention will be described with reference to the FIG. 1 forming a part of the present application. In FIG. 1, a cross-sectional schematic view of a capacitor is shown as represented at 10. The capacitor comprises an anode, 11, comprising tantalum. A dielectric layer, 12, is provided on the surface of the anode, 11, and may cover the entire surface of the anode. The dielectric layer is preferably formed as an oxide of tantalum as further described herein. Coated on the surface of the dielectric layer, 12, is a polymeric conducting layer, 13, as further described herein. It would be understood to those of skill in the art that the polymeric conducting layer does not have direct electrical conductivity with the anode. After formation of the polymer it is preferable to provide a coating comprising conductive carbon, 14, and a coating comprising silver or other metals like copper or nickel, 16, to allow adhesion to the cathode lead, 17, such as by an adhesive, 21. An anode lead wire, 18, is in electrical contact with the anode. An anode lead is attached to the anode. In one embodiment the anode lead wire is inserted into the tantalum powder prior to pressing wherein a portion of the anode wire is encased by pressure. For the present invention it is more preferred that the anode lead be welded to the pressed and pre-sintered anode. The anode lead wire is in electrical contact with an anode lead, 19, such as through a lead frame, 23, wherein the anode lead and lead frame may be integral components. The entire element, except for the terminus of the anode lead and cathode lead is then preferably encased in an exterior molding, 20, which is not electrically conductive. The exterior molding is preferably an organic and more preferably an epoxy resin. For convenience in handling, the tantalum anode is typically attached to a carrier thereby allowing large numbers of elements to be processed at the same time.

It is most desirable that the dielectric of the anode be an oxide of tantalum. The oxide is preferably formed by dipping the valve metal into an electrolyte solution and applying a positive voltage to the valve metal thereby forming anodic oxide $Ta_2O_5$.

The formation electrolytes are not particularly limiting herein. Preferred electrolytes for the formation of the oxide on the tantalum metal include diluted inorganic acids such as sulphuric acid, nitric acid, phosphoric acids or aqueous solutions of dicarboxylic acids, such as ammonium adipate. Other materials may be incorporated into the oxide such as phosphates, citrates, etc. to impart thermal stability or chemical or hydration resistance to the oxide layer.

The conductive polymer layer is preferably formed by dipping the anodized valve metal anodes into a water based dispersion which is a slurry of intrinsically conductive polymer. It is preferred that the anode be dipped into the slurry from 1 to 15 times to insure internal impregnation of the porous anodes and formation of an adequate external coating. The anode should remain in the slurry for a period of about 0.5 minute to 5 minutes to allow complete slurry coverage of its surface.

The conductive polymer is preferably selected from polyaniline, polypyrrole and polythiophene or substitutional derivatives thereof.

A particularly preferred conducting polymer is represented by Formula I:

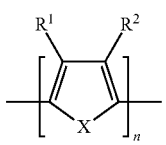

FORMULA 1 wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—$(CH_2)_2$—O— is most preferred. In Formula 1, X is S or N and most preferable X is S. A particularly preferred conductive polymer is polymerized 3,4-polyethylene dioxythiophene (PEDT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR3; or R1 and R2, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. R3 preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

Conductive polymeric cathodes have long been considered incompatible with moisture once formed. In direct contradiction to the expectations of those of skill in the art it has been realized herein that treatment in controlled moist atmosphere benefits the capacitor. While not limited to any theory, instead of the expected polymer degradation it is now believed that treatment in moist atmosphere plasticizes or hydrates the polymer thereby improving the polymer chains ionic mobility which improves the electrical properties of the capacitor. In one embodiment it is preferable to treat the formed capacitor in moist atmosphere, preferably prior to encapsulation, at a temperature of at least 0° C. to no more than 100° C. at a humidity of at least 50% relative humidity to no more than 90% relative humidity for a period of at least 2 hours to no more than 24 hours. The atmosphere may contain inert gas or consist essentially of inert gas. It is more preferred that a temperature range of about 15° C. to 40° C. be used due to cost considerations. The preferred humidity range is 50% to 70% relative humidity. Temperature, humidity and time are synergistic in that a higher humidity, lower temperature and longer time may provide a similar result to treatment at a higher temperature for a shorter time. Below about 0° C. the temperature is insufficient to achieve the desired results using a reasonable humidity and a reasonable time and the moisture may condense and freeze which is undesirable. Above 100° C. the ability to efficiently hydrate the polymer is not increased and the energy consumption is not desirable. Below a humidity of about 50% the temperature and or time required is unacceptable and above a humidity of about 90% condensation can occur which is detrimental. A time below about 2 hr. is insufficient to achieve the desired degree of plasticizing or hydration at an acceptable temperature and humidity and above a time of 24 hours manufacturing efficiency decreases. The temperature, humidity and time are optimized to obtain a moisture content within the polymer of up to the maximum amount of water absorbed which can be determined gravimetrically. A temperature, humidity or time beyond that necessary to achieve up to the maximum moisture adds no additional value. It is preferably that the temperature, humidity and time be optimized such that the moisture absorbed by the polymer is at least 20% to no more than 90% of the maximum moisture the polymer can absorb, without free water of condensation, as measured either gravimetrically or by increase in capacitance.

Examples

A comparative capacitor was prepared by compacting tantalum powder with a nominal charge of 12,000 μC/g to achieve a cylindrical anode with a diameter of 5 mm (0.20 inches) and a length of 10.7 mm (0.42 inches), with a tantalum wire extending therefrom, and sintering in vacuum. The dielectric was formed by conventional means at a formation voltage ($V_f$) of 75.2 volts. A conductive polymer cathode layer was formed by repeated dipping of the anode into a slurry of commercially available polyethylene dioxythiophene:polystyrene sulfonic acid (PEDT:PSSA) dispersion, which is commercially available as Clevios P from Hereaus. After polymer formation a conventional carbon coating was formed by dipping followed by dipping in a conventional silver solution. The Capacitance (CAP), Dissipation Factor (DF), Equivalent Series Resistance (ESR), DC Leakage, Break Down Voltage (BDV) and Resistance (R) after Breakdown (BD) was measured with the results reported in Table 1.

TABLE 1

| CAP (µF) | DF (%) | ESR (Ω) | DC Leakage (µA) | $V_f$ (V) | BDV (V) | R after BD (Ω) |
|---|---|---|---|---|---|---|
| 342 | 4.9 | 0.06 | 1.66 | 75.2 | 74.8 | 0.4 |

The results provided in Table 1 illustrate that the $Ta_2O_5$ dielectric formed at 75.2 V provided a capacitor with a break down voltage of only 74.8 V which is below the formation voltage. This is undesirable.

Another disadvantage of comparative capacitors is that a failure due to excessive voltage results in a low resistance or short circuit condition. From Table 1, the resistance after breakdown is 0.4Ω. The result of a low resistance failure mode can be catastrophic since the intended capacitor forms a near direct electrical short which can cause thermal runaway and significant damage to other parts of the circuit.

A series of inventive capacitors were formed in a manner identical to the formation of the comparative capacitor with the addition of decarbonizing and deoxidizing sintering steps. The samples are referred to as PHS F1/Slurry. The formation voltage and the optional humidity treatment are reported in Table 2. The powder had a nominal charge of 12,000 µC/g and was used as obtained by H. C. Stark. Some of the samples were tested dry at ambient temperature and some were treated at a temperature of 25° C. at a humidity of 60% for 24 hours. A graphical representation of the break down voltage as a function of formation voltage is provided in FIG. 2. The BDV trace and electrical parameters before and after breakdown are illustrated graphically in FIG. 3. Life test results demonstrated commercially viable long term leakage stability at 85° C. and rated voltage of 35 V which is 78% of the formation voltage. Capacitors formed by traditional methods must be rated at no more than about 40% of the dielectric formation voltage. The ability to rate a capacitor at a voltage closer to the formation voltage represents a major advance in the art with regards to energy efficiency in manufacturing.

As illustrated in FIG. 2 the BDV exceeds the formation voltage at a formation voltage of less than 100 V with an improved BDV realized for humidified parts. There was no loss in capacitance, relative to the comparative capacitor, above the $V_f$ and below BDV. Furthermore, the resistance of the capacitor after failure was several MΩ which is considered to be the practical equivalent of an 'open circuit' failure mode as opposed to the short circuit failure mode found with comparative capacitors. For the purposes of the instant invention an open circuit failure mode is defined as capacitor having a resistance of at last 1,000Ω after breakdown failure due to excessive voltage. More preferably, the capacitor has a resistance of at least 100,000Ω after breakdown failure.

Further to the results illustrated in FIG. 3, prior to BDV testing the capacitors formed at 28 V illustrated an average capacitance of 157.3 uF; dissipation factor (Df) of 2.6% and resistance of 4 MOhm. As it's shown in FIG. 3 BDV was equal 50 V, which is much higher than formation voltage 28 V. After the BDV test the capacitors formed at 50 V, and treated to failure, had an average capacitance of 154 uF, a DF of 8.2% and a resistance of 1.3 MOhm wherein the high resistance after break down is representative of a high resistance open failure mode instead of an electrically shorted failure mode. Subsequent studies illustrated that the capacitance remained stable above $V_f$ until BDV was reached.

Samples were prepared for demonstrating the impact of powder charge and humidification. Multiple samples were prepared in accordance with the comparative example with the exception of the powder charge, humidity treatment and formation voltage with each parameter reported in Table 2.

TABLE 2

| Powder Charge (µC/g) | Humidification Time (hrs) | Cap (µF) | DF (%) | ESR (Ω) | DC L (µA) | $V_f$ (V) | BDV (V) | R after BD (Ω) |
|---|---|---|---|---|---|---|---|---|
| 12,000 | 0 | 320 | 3.7 | 0.04 | 0.7 | 45 | 57 | 200K |
| 12,000 | 8 | 361 | 4.4 | 0.04 | 0.6 | 45 | 72.8 | 900K |
| 12,000 | 24 | 375 | 3.7 | 0.04 | 0.5 | 45 | 73.3 | 2.9M |
| 25,000 | 24 | 573 | 13.6 | | | 45 | 69.4 | 286K |

As can be seen in Table 2, the capacitance increases with powder charge, as expected, and with humidification, which is contrary to expectations. The remaining parameters demonstrate the advantages of the invention.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A method for forming a capacitor comprising:
    forming a tantalum anode from a tantalum powder with a powder charge of no more than 40,000 µC/g;
    forming a dielectric on said anode by anodization at a formation voltage of no more than 100 V;
    forming a conductive polymeric cathode on said dielectric; and
    wherein said capacitor has a breakdown voltage higher than said formation voltage.

2. The method for forming a capacitor of claim 1 wherein said tantalum powder has a powder charge of at least 5,000 µC/g.

3. The method for forming a capacitor of claim 2 wherein said tantalum powder has a powder charge of at least 10,000 µC/g to no more than 25,000 µC/g.

4. The method for forming a capacitor of claim 1 wherein said formation voltage is at least 25 Volts.

5. The method for forming a capacitor of claim 1 wherein said formation voltage is at least 40 volts.

6. The method for forming a capacitor of claim 1 wherein said conductive polymeric cathode comprises polythiophene.

7. The method for forming a capacitor of claim 6 wherein said conductive polymer is poly-3,4-polyethylene dioxythiophene.

8. The method for forming a capacitor of claim 1 wherein said forming of said conductive polymeric cathode is by dipping in a polymer slurry.

9. The method for forming a capacitor of claim 8 wherein said polymer slurry comprises poly-3,4-polyethylene dioxythiophene.

10. The method for forming a capacitor of claim 1 wherein said capacitor has a resistance of at least 1,000Ω after treatment at a voltage exceeding said breakdown voltage.

11. The method for forming a capacitor of claim 10 wherein said capacitor has a resistance of at least 100,000Ω after treatment at a voltage exceeding said breakdown voltage.

12. The method for forming a capacitor of claim 1 further comprising treating said capacitor to moist atmosphere.

13. The method for forming a capacitor of claim 12 wherein said moist atmosphere is at a temperature of at least 0° C. to no more than 100° C. with at least 50% relative humidity to no more than 90% relative humidity.

14. The method for forming a capacitor of claim 12 comprising treating with said moist atmosphere to achieve up to a maximum amount of water absorbed.

15. The method for forming a capacitor of claim 14 comprising treating with said moist atmosphere to achieve a moisture content of 20-90% of said maximum amount of water absorbed.

16. The method for forming a capacitor of claim 1 wherein said capacitor has a maximum rated voltage of at least 60% to no more than 90% of said formation voltage.

17. The method for forming a capacitor of claim 1 wherein said forming of said tantalum anode further comprises sintering.

18. The method for forming a capacitor of claim 1 wherein said sintering further comprises at least one of decarbonizing or deoxygenating.

\* \* \* \* \*